United States Patent [19]

Rabii

[11] Patent Number: 5,045,929
[45] Date of Patent: Sep. 3, 1991

[54] THREE DIMENSIONAL LUMA/CHROMA SEPARATION AND VERTICAL DETAIL GENERATION

[75] Inventor: Khosro M. Rabii, Arlington Heights, Ill.

[73] Assignee: Zenith Electronics Corporation, Glenview, Ill.

[21] Appl. No.: 356,024

[22] Filed: May 13, 1989

[51] Int. Cl.[5] .................................. H04N 9/78
[52] U.S. Cl. ........................................ 358/31
[58] Field of Search .......................... 358/31

[56] References Cited

U.S. PATENT DOCUMENTS

| | | | |
|---|---|---|---|
| 3,996,610 | 12/1976 | Kawamoto | 358/31 |
| 4,636,840 | 1/1987 | McNeely et al. | 358/31 |
| 4,639,767 | 1/1987 | Suzuki | 358/21 R |
| 4,641,180 | 2/1987 | Richter | 358/31 |
| 4,651,206 | 3/1987 | Ohki | 358/136 |
| 4,739,390 | 4/1988 | Achiha et al. | 358/11 |
| 4,745,458 | 5/1988 | Hirano et al. | 358/11 |
| 4,754,322 | 6/1988 | Okuda et al. | 358/37 |
| 4,853,775 | 8/1989 | Rouvrais et al. | 358/105 |
| 4,868,650 | 9/1989 | Weckenbrock | 358/105 |
| 4,891,699 | 1/1990 | Hamada et al. | 358/136 |
| 4,901,145 | 2/1990 | Harradine et al. | 358/105 |

FOREIGN PATENT DOCUMENTS

| | | | |
|---|---|---|---|
| 123280 | 9/1980 | Japan | 358/31 |
| 95788 | 6/1982 | Japan | 358/31 |
| 161484 | 9/1983 | Japan | . |

Primary Examiner—John W. Shepperd

[57] ABSTRACT

A three dimensional luma/chroma separation system with vertical detail generation is disclosed. The disclosed separation system uses three multiplexers to provide continuous, optimal separation of luma and chroma according to one of three separation or combing techniques as well as to provide the appropriate vertical detail signal for each luma/chroma separation technique. The disclosed system further provides input/output capability with special case applications, such as Super VHS format equipment and signals. Operation of the multiple multiplexers is controlled by signals generated according to actual picture content.

15 Claims, 11 Drawing Sheets

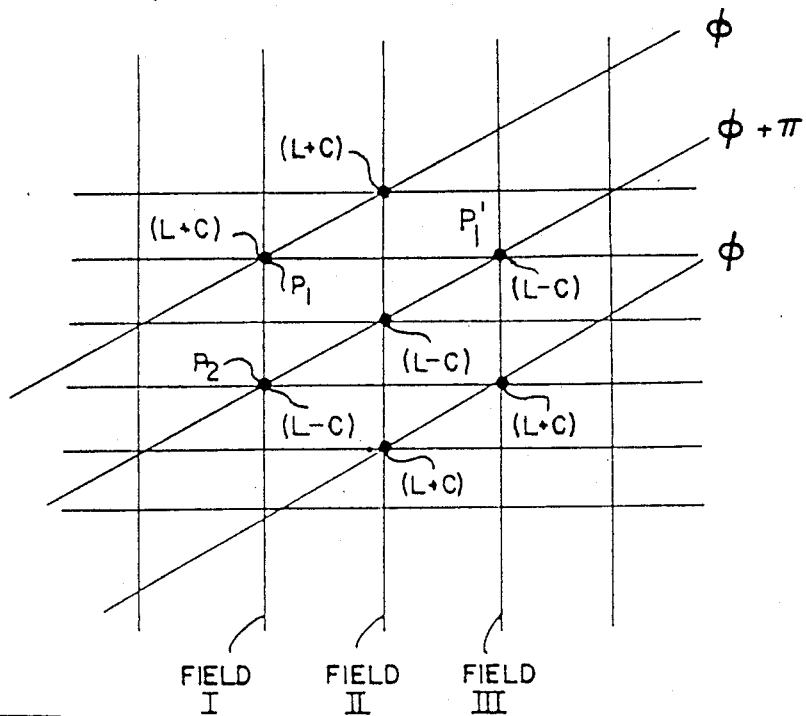
FIG_6_
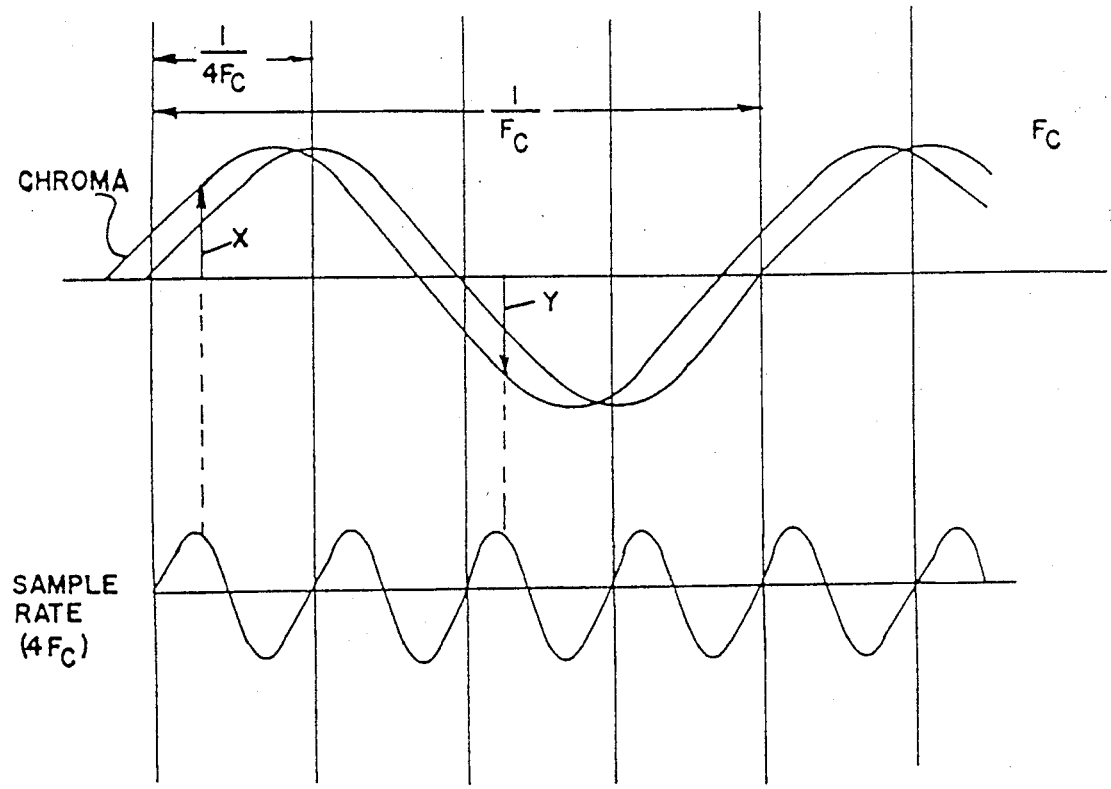
FIG_7_

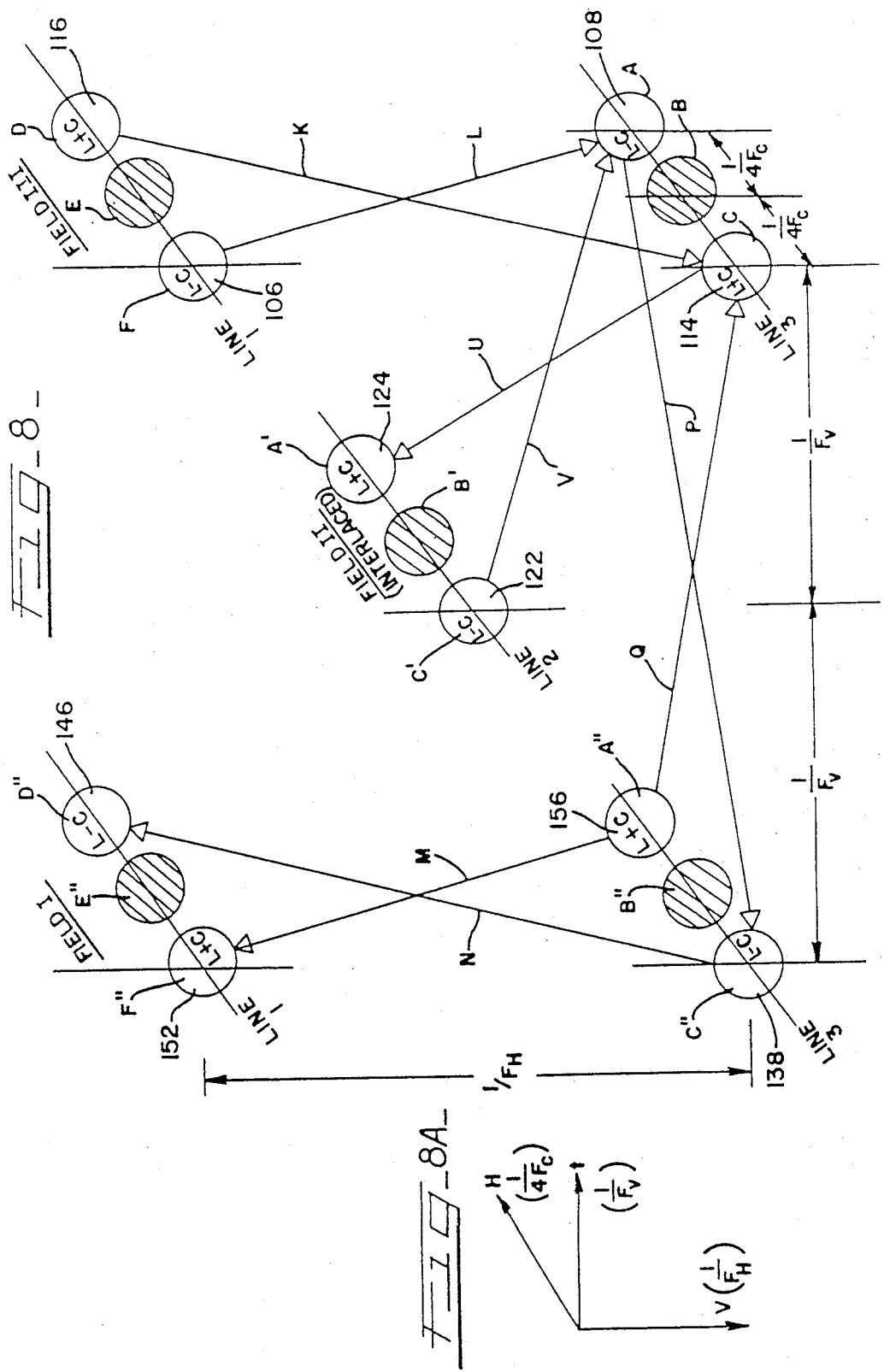

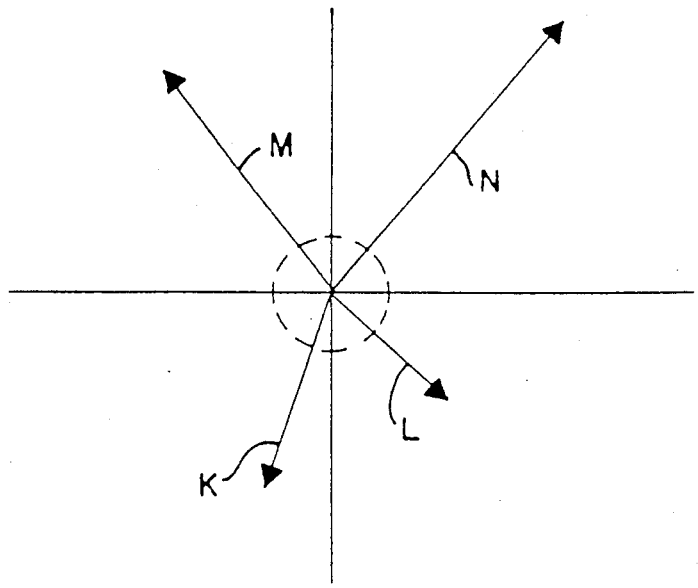
FIG_9_
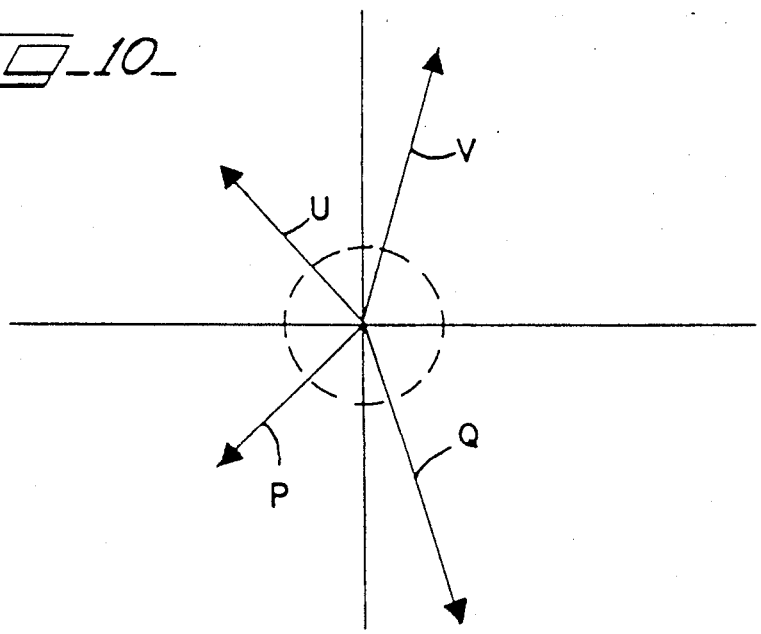
FIG_10_

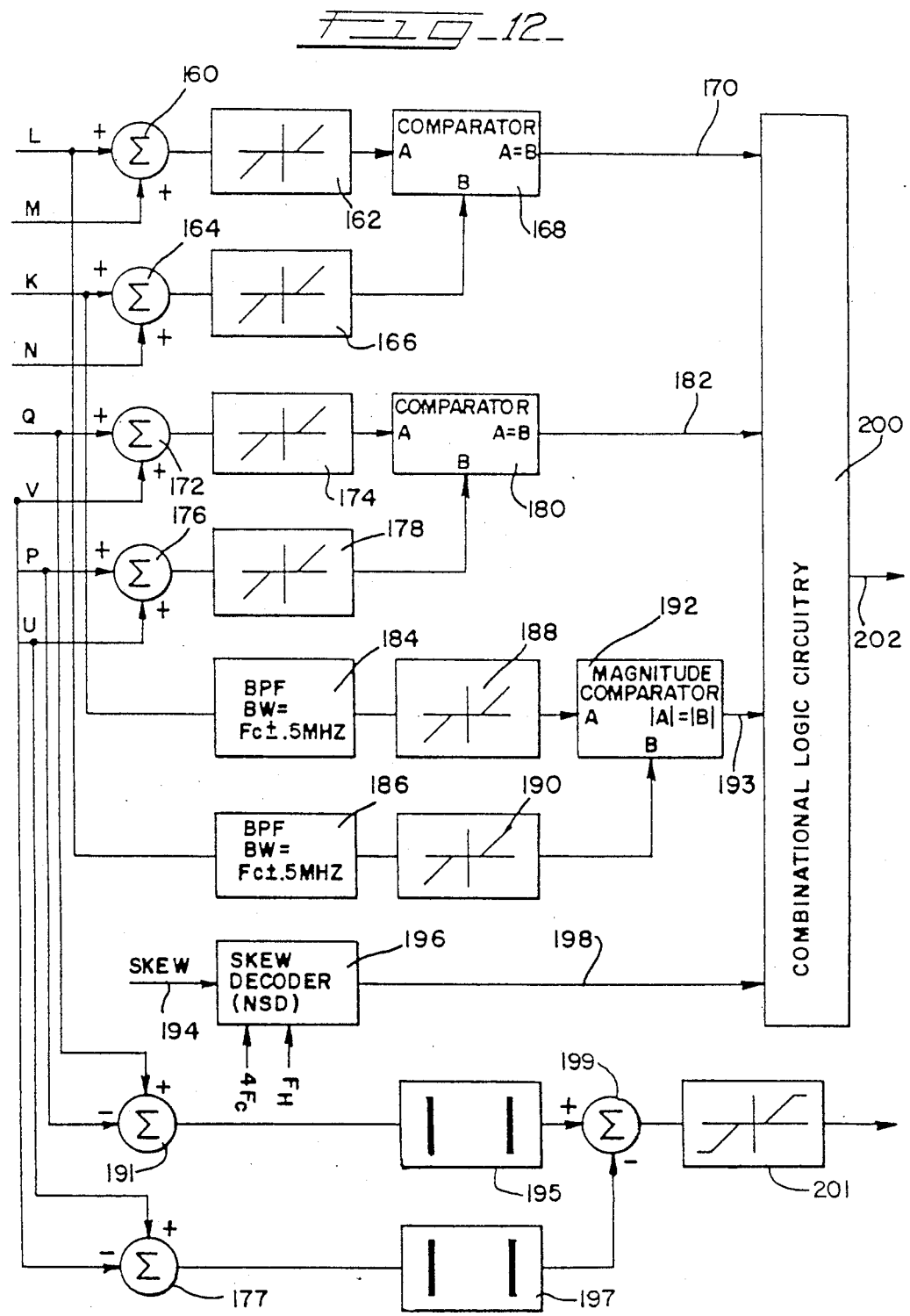
FIG_12

FIG_13_
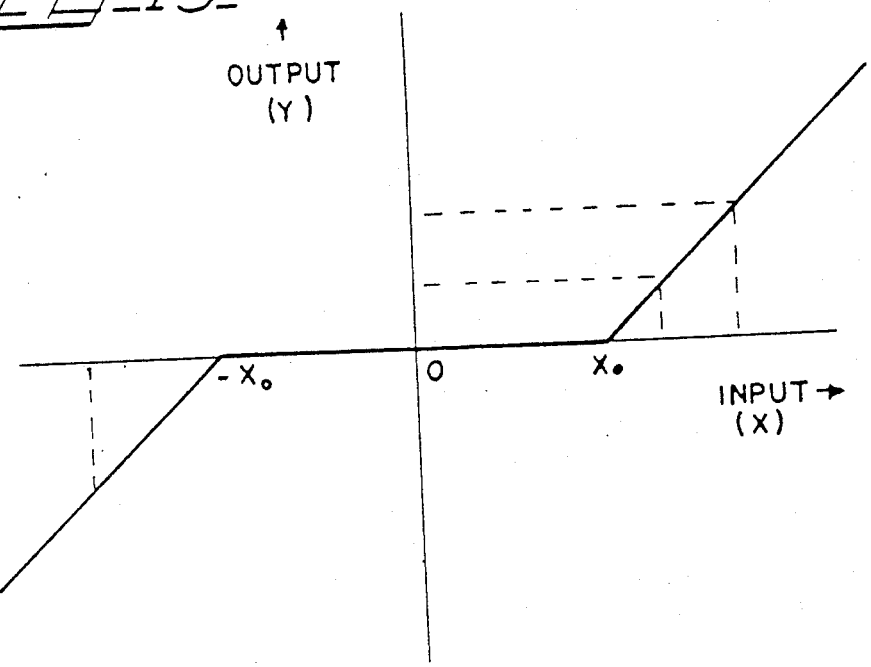
FIG_14_
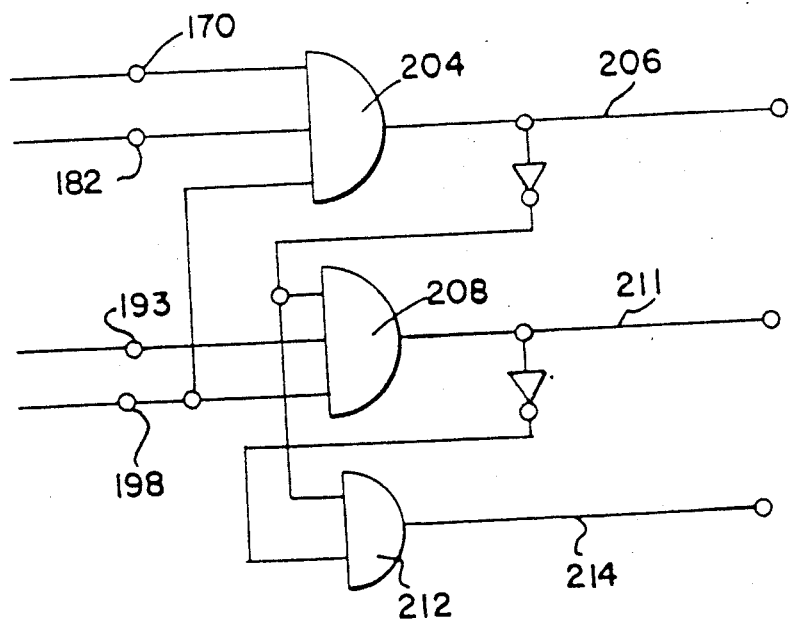

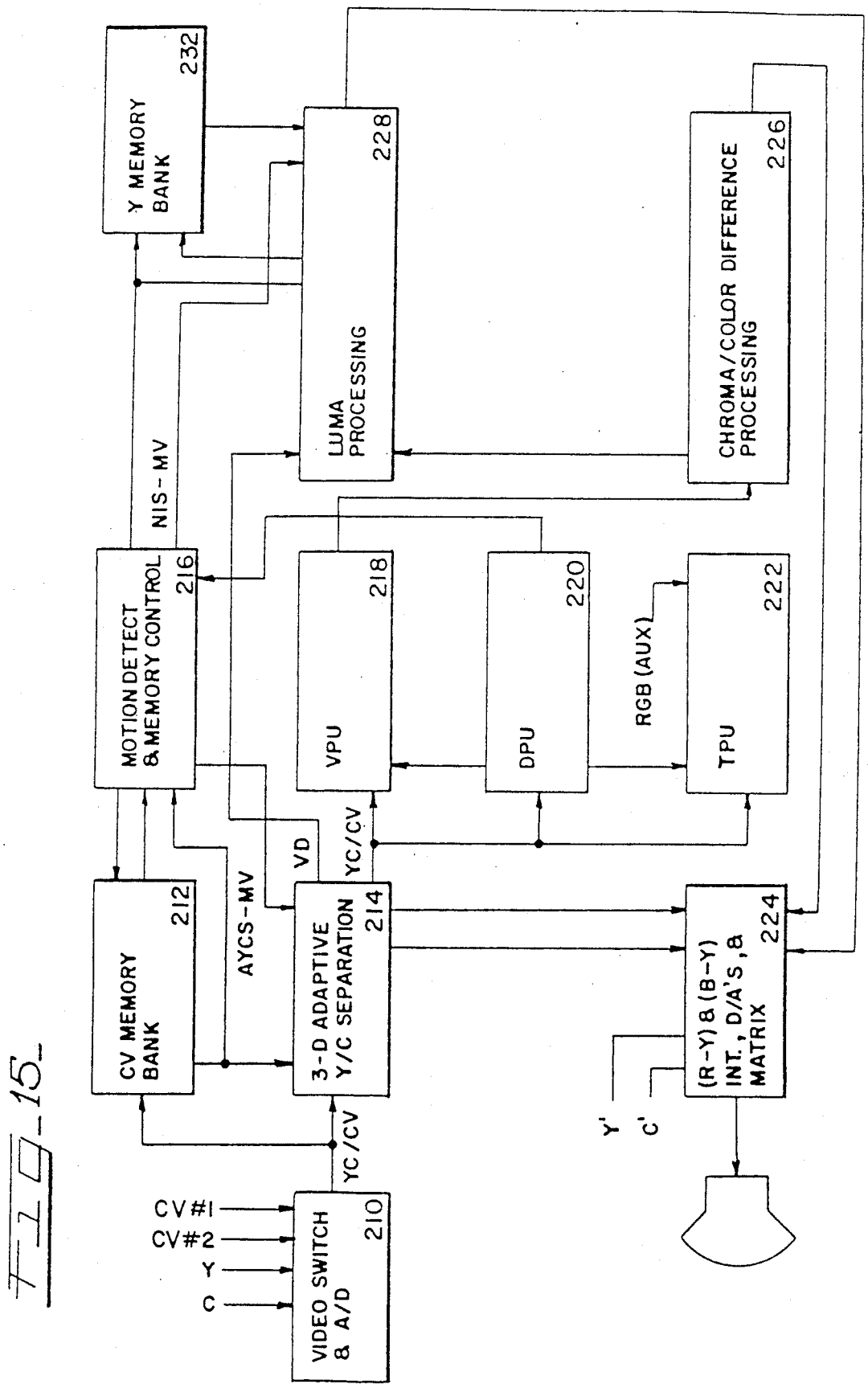

FIG. 17

| COMPOSITE VIDEO | | Y-MUX | C-MUX | VD-MUX I | VD-MUX II | INPUT MUX | FIELD MUX |
|---|---|---|---|---|---|---|---|
| STATIC | S | I 2 | I 2 | I 2 | I 1 | I 1 | I 1 |
| | NS | I 3 | I 3 | NONE | | DON'T CARE | DON'T CARE |
| DYNAMIC | S | I 1 | I 1 | I 1 | I 2 | I 1 | I 1 |
| | NS | I 3 | I 3 | NONE | | DON'T CARE | DON'T CARE |

| Y/C | Y-MUX | C-MUX | VD-MUX I | VD-MUX II | INPUT MUX | FIELD MUX |
|---|---|---|---|---|---|---|
| STATIC | I 4 | I 4 | I 2 | I 1 | I 1 | I 1 |
| DYNAMIC | I 4 | I 4 | I 1 | I 1 | I 1 | I 1 | ent
THREE DIMENSIONAL LUMA/CHROMA SEPARATION AND VERTICAL DETAIL GENERATION

BACKGROUND OF THE INVENTION

The present invention relates generally to television systems. More particularly, the present invention relates to improved definition television systems which seek to provide a higher quality picture from now-standard broadcast signals. Even more particularly, the present invention seeks to provide improved video signal processing and noise immunity characteristics in response to signal content to provide desired improvements in picture display.

High definition or enhanced definition television ("HDTV") systems seek to provide a higher quality television picture by improving the characteristics of the broadcast or transmitted signal. Several such systems are now known; all, to date, require additional electromagnetic spectrum bandwidth to provide the enhanced broadcast signals. In contrast, improved definition television systems seek to provide a higher quality television picture by improving the characteristics of the signal processing at the television receiver. Improved definition systems seek to give a better picture within present broadcast standards, e.g., the six megahertz (6 mhz.) per channel standard in the NTSC system.

Standard video signal processing uses some type of filtering to separate or comb the 3.58 megahertz color carrier signal from the 4.25 megahertz bandwidth luma signal. Desirably, the implemented filtering prevents artifacts or distortions in the displayed picture. Without some filtering, the amplitude modulated color signal can produce a grid appearance on the screen in response to chroma signals that are mistakenly recognized as and then processed as luma signals.

However, several known filtering techniques each can introduce undesired artifacts in the displayed picture. For example, the simplest filtering technique, notch filtering, can undesirably reduce resolution. A notch filter removes video signal in a notch surrounding the 3.58 megahertz chroma carrier. Alternately, a notch filter provides luma in the bandwidth of zero to about 3.1 mhz. However, that also removes luma within the same region or above the filter cutoff frequency, thereby reducing horizontal resolution. This becomes readily apparent when the television camera pans back from a structure, such as a tall office building, comprised of many smaller, horizontal elements, such as windows; at some point the building and windows will become blurred—that point occurring when the level of detail necessary to resolve the window edges passes into the notch above about 3.1 MHz.

Alternate filtering techniques include line filters. Such filters rely on the known characteristic of standard video signals that alternate lines of each picture have opposite polarity chroma signals. Pure luma may be extracted by adding the video signals for adjacent lines (typically stored in a line buffer or memory), thereby cancelling chroma. However, this does not always work; for example, when one line has no chroma, simply adding it to the next line will not cancel the chroma. This creates a loss of vertical resolution and gives the appearance of "hanging dots" on the screen. The hanging dots appear in a zipper pattern which seems to move back and forth on the screen as the non-cancelled chroma information is processed as luma.

One other method is known as frame filtering or combing. This technique relies on another known characteristic of standard video signals, namely that the same line in alternate frames carries chroma of opposite phase. However, this technique can only be used when succeeding frames have identical video content. If not, then the displayed picture is undesirably distorted.

Of course, any filtering technique must completely separate the chroma information for chroma processing. In the worst case, an inadequate filter can result in luma being interpreted as chroma. This creates highly undesirable cross chrominance in the displayed picture. Likewise, noise in the television signal can undesirably affect the processing of the luma and chroma components.

Each of the known and described filtering techniques provides adequate performance and an acceptable display in some circumstances. However, each suffers drawbacks or inadequacies as described in the foregoing examples. Accordingly, the present invention seeks to provide an improved signal processing technique that generally overcomes the deficiencies of the prior art and provides improved picture display. The present invention lies, in part and fundamentally, upon recognizing actual picture content—within selected noise levels.

A further object of the present invention lies in the implementation of techniques for choosing one or more processing methods in response to received video signals.

A further object of the present invention lies in providing an improved picture quality based upon actual picture content.

A further object of the present invention is to provide enhanced video signal processing through recognition of selected characteristics in the video content of received picture signals.

Another object of the present invention lies in providing improved displayed picture quality through reduced noise susceptibility in chroma/luma processing. A broader related object lies in improving noise immunity in composite video processing.

Yet a further object of the present invention is to provide a motion detection technique for improved signal processing to provide an improved picture display.

BRIEF DESCRIPTION OF THE FIGURES

Those features of the present invention which currently are believed to be novel are set forth with particularity in the appended claims. The foregoing objects, in addition to other further objects and advantages, of the present invention may be more fully understood and appreciated by reference to the following detailed description taken in conjunction with the accompanying drawings of which:

FIG. 6 provides a further diagrammatic representation of a pixel matrix for three fields related to the motion detection technique of a preferred embodiment of the present invention;

FIG. 7 illustrates the relationship between the four times chroma (4Fc) sampling signal and the fundamental chroma signal;

FIG. 8 provides a further diagrammatical representation of pixel information for use in the motion detection technique of a preferred embodiment of the present invention;

FIG. 8A illustrates the horizontal, vertical and time axis for the pixel diagram of FIG. 8;

FIG. 9 represents a first set of vectors for use in a motion detection technique of a preferred embodiment of the present invention;

FIG. 10 illustrates a second set of vectors for use in a motion detection technique of a preferred embodiment of the present invention;

FIG. 12 illustrates additional signal combination schematics for providing motion variable information and prediction in accordance with a preferred embodiment of the present invention;

FIG. 13 illustrates a scaling function for use in processing motion variables according to a preferred embodiment of the present invention;

FIG. 14 illustrates a combination logic schematic for providing output signals indicative a desired filtering technique in response to the motion variables generated in accordance with a preferred embodiment of the present invention;

FIG. 15 illustrates a general digital television system envisioned as the operating environment for the preferred embodiment of the present invention;

FIG. 17 illustrates various logic state combinations for implementation of multiplexing techniques used in the logic schematic of FIG. 15.

DETAILED DESCRIPTION OF THE PREFERRED EMBODIMENT

Generally, the present invention provides an improved technique for providing display of received broadcast television signals. Initially, a preferred embodiment analyses actual picture content in two or more display lines in a current display field and corresponding display lines in two or more previous display fields. Vectors based on this analysis are then processed to provide an indication of motion in the picture within an acceptable range governed therefor by use selected noise level parameters. The technique of the present invention then selects one of three or more techniques for separating luma and chroma from composite video. The composite video signal and picture content is analyzed; selected comparisons are made to provide information that reflects actual picture content. That information is employed to select one of the luma/chroma separation techniques.

Figure 1:
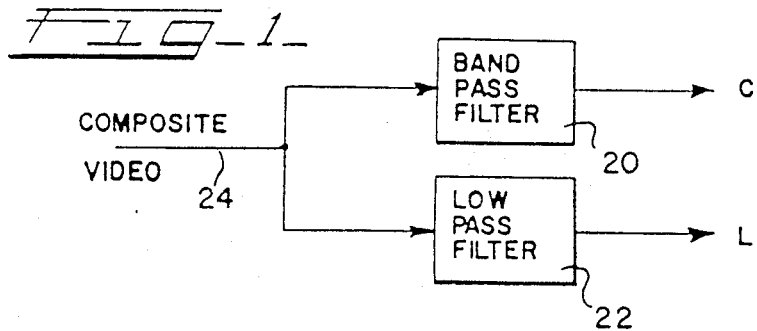
FIG. 1 illustrates a first chroma/luma filtering method for separating chroma and luma in a composite video signal.

Referring now to the drawings, FIG. 1 illustrates a first technique that employs conventional one dimensional filtering methods where luma is derived from a low pass filter and chroma from a band-pass filter. More particularly, a band pass filter 20 and a low pass filter 22 both receive a composite video signal on an input line 24. The band pass of filter 20 is centered at 3.58 MHz (typically ±0.5 MHz), thereby providing separated chroma as an output. The low pass filter 22 has a cutoff frequency desirably at about 3.0 MHz, thereby providing separated luma as an output. Alternately, the low pass filter 22 could be replaced with a notch filter arrangement that blocks only those frequency components of the received composite video signal that are passed by the band pass filter 20.

Figure 2:
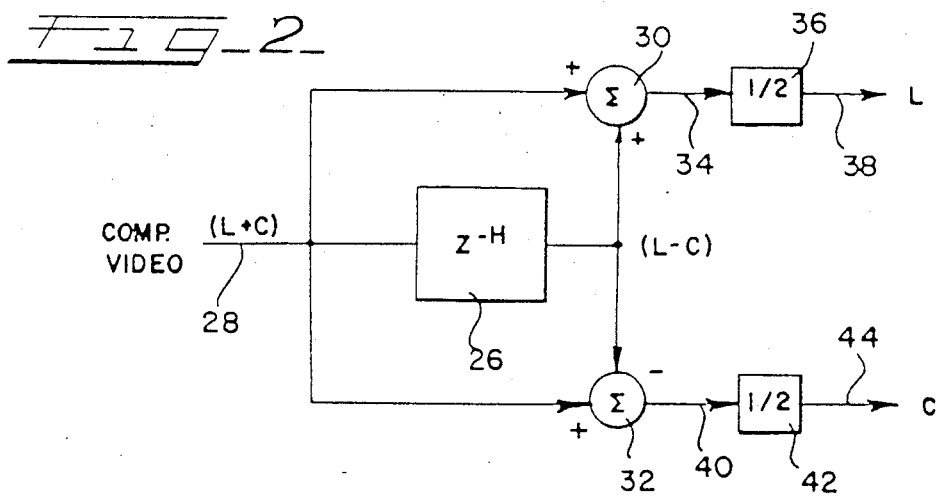
FIG. 2 represents a second method, line filtering, for separating luma and chroma in a composite video signal.

FIG. 2 illustrates a second technique for chroma/luma separation which employs a two-dimensional filter (line comb). In the system of FIG. 2, a one-line delay 26, labeled $Z^{-H}$ receives a composite video signal on a line 28. A first summer 30 and a second summer 32 also receive the composite video signal from the line 28. The first summer 30 adds the received composite video signal with the output of the one-line delay circuit 26. The second summer 32 subtracts the output of the one-line delay circuit 26 from the receive composite video signal. It will be appreciated that, because the chroma signal is opposite in phase for adjacent lines, at any one time, the output of the one-line delay circuit 26 will represent a composite video signal in which the chroma signal is exactly opposite in phase to the input signal on the line 28. This may be represented illustratively by designating the received composite video signal as (L+C) and the output of the one-line delay circuit 26 as (L−C).

Thus, the output of the summer 30, at which the received composite video signal from line 28 and the output of the one-line delay circuit 26 are each positively combined, represents a video signal having only luma, although at twice the normal magnitude, on a line 34. The signal on the line 34 may then be scaled at a scaling circuit 36 to provide luma on an output line 38. Correspondingly, the second summer 32 receives the composite video input signal from the line 28 and subtracts from it the output of the one-line delay circuit 26. In this fashion, the output on a line 40 represents only chroma information, at twice the normal magnitude. The signal may then be scaled at a scaling circuit 42 to provide a chroma signal on an output line 44. In this fashion, separate luma and chroma signals are provided.

Figure 3:
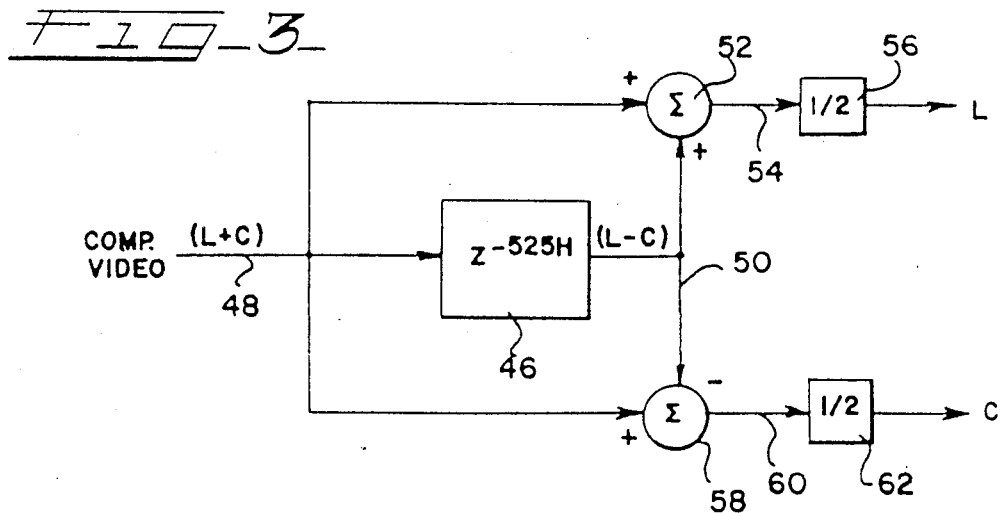
FIG. 3 illustrates a third method, frame filtering, for separating luma and chroma information in a composite video signal.

Referring now to FIG. 3, therein is shown a system for implementing a third technique, known as a three dimensional filter or frame comb, for separating luma and chroma in a composite video signal. In this technique, a one frame delay 46, illustrated as $Z^{-525H}$, receives a composite video signal from an input line 48. The output of the one frame delay 46 at a line 50 thus represents composite video exactly one frame delayed from that received on the input line 48. This system takes advantage of the known characteristic that alternate frames of a picture carry chrominance having opposite phases. Thus, the input and output to the one frame delay 46 in FIG. 3 may be represented similarly to that of the one line delay 26 of FIG. 2. That is, the input may be represented as (L+C), and the output may be represented as (L−C).

The output of the one frame delay 46 is supplied as a positive input to a first summer 52. The summer 52 also receives, as a positive input, the composite video signal from the line 48. Because of the opposite polarity of chroma in these two signals, the output on a line 54 thus represents a pure luma signal at twice normal magnitude. A scaling circuit 56 reduces that to a signal having pure luminance at the received magnitude. Correspondingly, a second summer 58 receives the output from the one frame delay 46 as a negative input and the composite video signal from the line 48 as a positive input. The difference signal on a line 60 then represents pure chroma at twice normal magnitude. A scaling circuit 62 scales that to provide pure chroma signal at normal magnitude as an output.

Figure 4:
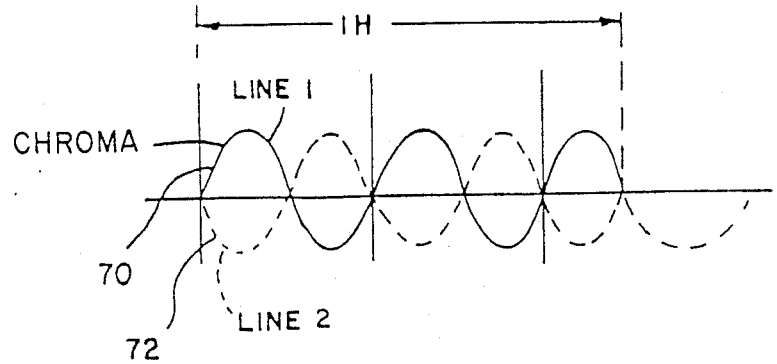
FIG. 4 illustrates an exemplary chroma signal.

As mentioned, the line comb operates on the principle that the chroma phase between two successive lines in a field are opposite, and the frame comb operates on the principle that the chroma phase of corresponding lines a frame apart are opposite. FIG. 4 generally illustrates chroma waveforms showing the characteristics utilized in the line and frame combs of FIGS. 2 and 3, respectively. It should be appreciated that the chroma subcarrier frequency ($F_C$) is an odd multiple of the horizontal scanning frequency ($F_H$) divided by 2, that is 455/2, then (455/2) $F_H = F_C$ and 525 Fframe $= F_H$. FIG. 4 illustrates a first waveform 70 which represents a chroma signal for a first line. As shown, two and one half cycles of $F_C$ equals one line (1H). FIG. 4 illustrates a chroma signal for the succeeding line in the picture as waveform 72 (in dashed lines). Again, a line equals two and one half cycles of $F_C$. As shown, also, the chroma for the second succeeding line is opposite in phase to that for the first line. The second line also corresponds to the chroma for the first line in the next frame, i.e. line 526 from the first frame. It is this relationship that the filtering techniques of FIGS. 2 and 3, line and frame comb, take advantage of to provide the desired luma/chroma separation.

Thus, for the line comb, two successive lines can be represented by luma (L) plus chroma (C) and luma (L) minus chroma (C) or (L+C) and (L−C). Luma is derived by adding the components (normalized to one-half (0.5)) and chroma is derived by subtracting the components (normalized to one half (0.5)). The frame comb operates in a similar manner except that corresponding frames are processed instead of lines.

All three luma/chroma separation techniques have their advantages and disadvantages. In the one-dimensional filtering method of FIG. 1, high frequency components of luma information are lost in the luma low pass filter 22. In the two-dimensional filter (line comb) of FIG. 2, dot patterns (hanging dots) are produced when chroma changes. The three dimensional frame comb of FIG. 3 produces objectionable results when there is temporal variation in the image. The invention, as exemplified by the preferred embodiment, is therefore directed to a technique for selecting which luma/chroma separation method to use at any given time. The preferred embodiment of the present invention generates and responds to unique criteria for separating luma from chroma for each pixel in the picture.

In the preferred embodiment of the present invention, pixel elements from each of three succeeding fields are analyzed to recognize selected characteristics in the displayed picture. Recognition of particular characteristics provides an indication of which of the three techniques for luma chroma separation to use for each pixel element in the displayed picture.

Figure 5:
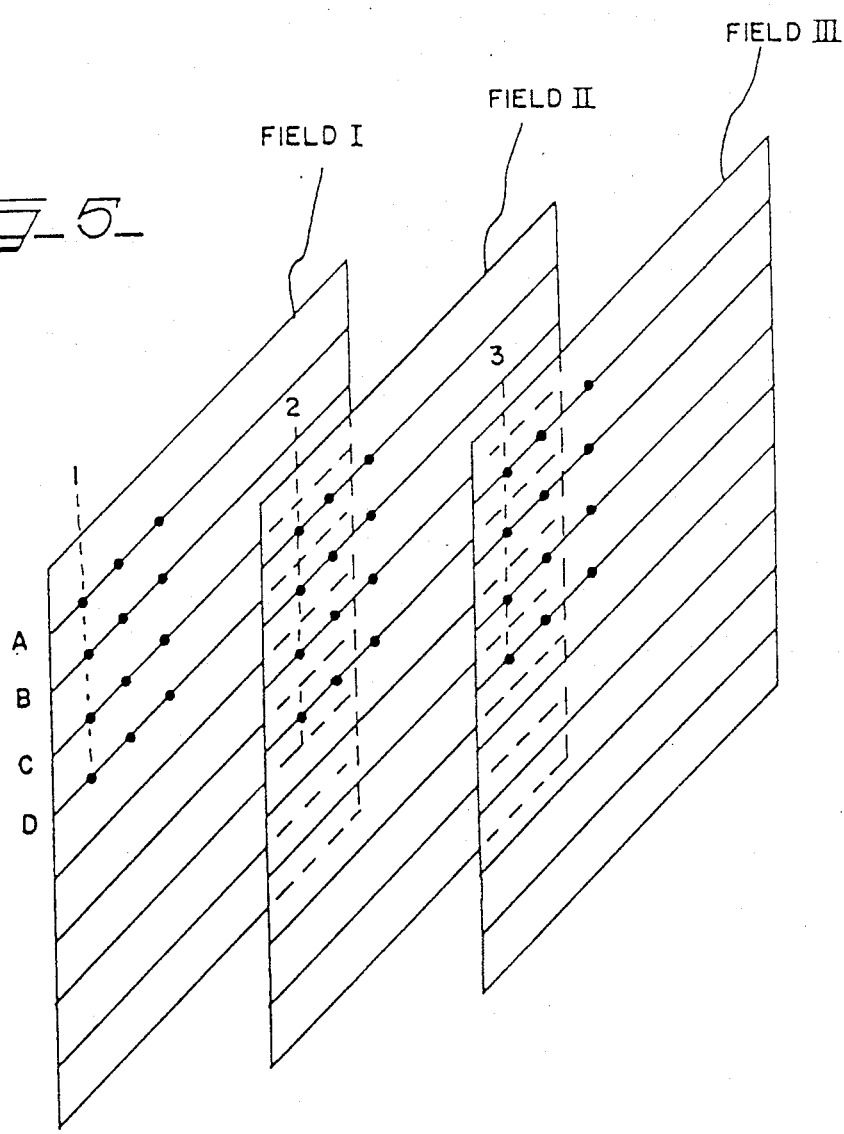
FIG. 5 illustrates a dot matrix, pixel pattern for use in a motion detection technique of a preferred embodiment of the present invention.

Referring now to FIG. 5, therein is shown three successive fields of video, each field including a plurality of horizontal scanning lines comprising nine hundred ten (910) pixel samples. It will be appreciated that field I represents the odd lines from the first frame. Field II then follows in time after field I and is interlaced therewith by providing the even lines from that same frame. Field III then follows field II and is overwritten over the odd display lines from field I so that it too is interlaced with field II in the displayed picture.

Referring now to FIG. 6, therein is shown a vertical slice of the three fields illustrated in FIG. 5. The diagram of FIG. 6 shows the relationship of the chroma phase for the various pixels in the succeeding fields and succeeding lines. Thus, spatial phase alignment, i.e., spatially phase aligned pixels, is an inherent characteristic of the NTSC system. This allows the operation described above in terms of both line and frame combing. For example, pixel $p_1$ in field I has opposite polarity chroma as pixel $p'_1$ in the third field (III). Correspondingly, pixel $p_2$ on the succeeding line in field I has the opposite phase chroma from that of pixel $p_1$ in the same field. As shown, pixels lined along a diagonal from lower left to upper right have chrominance of the same polarity ($\phi$ or $\phi + \pi$). Pixels along a diagonal from the upper left to the lower right alternate in a chrominance polarity. Vertically adjacent pixels in the vertical columns also alternate in polarity as do horizontally adjacent pixels in the horizontal rows.

The digital television system of the preferred embodiment uses a 4Fc sampling signal locked to the chroma burst frequency, Fc. This is illustrated in FIG. 7. Because of this sampling method, it will be seen that alternate chroma samples are one hundred eighty degrees (180°) out of phase. As shown by example in FIG. 7, sample x and sample y (alternate samples) are opposite in phase.

Generally speaking, a frame comb will provide perfect separation if no temporal change (e.g. motion) occurs in the image. In fact, absent such change or motion, frame (three-dimensional) combing provides the best luma/chroma separation of the three discussed methods. The presence or absence of such change is detected in a two-step process as shown in FIGS. 8 through 12.

Referring now to FIG. 8 therein is shown a diagrammatical representation of selected pixels from three succeeding fields (I, II, III) such as those shown generally in FIG. 5. The diagram of FIG. 8 shows these pixels in a time-space relationship. Adjacent pixels in each display line are shown along an axis from lower left to upper right with each succeeding pixel being up and to the right from previous pixels. Adjacent lines in each field are shown vertically displaced by a time equal to 1/$F_H$. Interlaced lines in succeeding fields are shown horizontally displaced by a time equal to 1/$F_V$. The same live in succeeding fields is represented as being displaced horizontally by a time equal to 2/$F_V$. Adjacent pixels in the same display line are displaced by a time factor of 1/4$F_C$.

FIG. 8A illustrates the orientation between the horizontal, vertical and time axis for the pixel diagram of FIG. 8, as described above. The units for each (¼hd Fc, 1/$F_H$ and 1/$F_v$, respectively) are also shown.

For clarity purposes, each of the pixels shown in FIG. 8 has been assigned an alpha numeric reference that is indicative of its relationship to the current pixel of the current display line. Because as shown in the diagram, time advances to the right and subsequent scan lines fall vertically below previous scan lines and subsequent pixels are displaced to the right of previous pixels in a raster scan, the current pixel in FIG. 8 is the third pixel shown in line 3 of field III. This pixel has been labeled 37 A". The previous pixel has been labeled 37 B", and the next previous pixel has been labeled 37 C". The corresponding pixels in the previous display line of the same field have been labeled 37 D", 37 E" and 37 F", respectively. Similarly, the corresponding pixels in the adjacent, interlaced line of the previous field have been labeled 37 A'", 37 B'" and 37 C'", respectively. Likewise, the corresponding pixels in the previous display frame have been labeled 37 A'"", 37 B'"", 37 C'"", 37 D'"", 37 E'"", and 37 F'"". These labels are used for convenience throughout the following discussion.

Those pixels that are involved in the comb filtering have been shown in cross-hatching. Those adjacent pixels that are used for motion detection are shown without cross-hatching.

In particular, in the first step, motion is detected by comparing pixels in corresponding fields. This step comprises developing four vectors K and L (from field III) and M and N (from field I) and determining whether their resultants occupy a predetermined region of spatial convergence. Referring to FIG. 8, all four vectors are derived by subtracting pixels corresponding to chroma samples of like phase. Thus, vector M is derived by subtracting pixel 3 of line 3 from pixel 1 of line 1, both pixels being in field I and both having the same chroma phase (pixel F"-pixel A"). Likewise, vector N is derived by subtracting pixel 1 in line 3 from pixel 3 in line 1 in field I (D"-C"). This vector will have the opposite phase since both pixels are 180 degrees out of phase with the pixels used to derive vector M. Correspondingly, vector K is derived by subtracting pixel 3 of line 3 from pixel 1 of line 1 in field III, both pixels having the same chroma phase (F-A). Vector L is derived from subtracting pixel 1 in line 3 from pixel III in line 1, also in field III and both having the same chroma phase (D-C). As with vectors M and N, vectors L and K will have the opposite phase since the pixels used to derive vector K are 180° out of phase with the pixels used to derive vector L.

FIG. 9 shows the resulting vector-diagram. Vectors M and L are of opposite polarity and represent corresponding portions of a displayed image one frame apart. Vectors N and K have similar characteristics. Thus, if no spatial motion has occurred during the frame, the resultant of vectors M and L and the resultant of vectors N and K will substantially converge to zero. To account for noise and the like a predetermined region of convergence is established (through the use of vector filters). If the magnitude components of the resultant vectors fall within this region, it is assumed that no spatial motion has occurred. In the case of no spatial motion, and subject to satisfaction of the additional condition described below, the frame comb technique will be used for luma/chroma separation.

In addition to the foregoing, a second step tests for temporal convergence in determining whether frame comb luma/chroma separation should be used. Temporal convergence is detected by deriving vectors P, Q, U and V. Vector P represents the difference between like-phase pixels (e.g., L−C) in corresponding lines of adjacent frames, e.g., line 3 in fields I and III (C"-A). Vector V represents the difference between like-phase pixels in adjacent lines in adjacent fields (e.g., line 2 in field II and line 3 in field III) (A-C'). Vectors Q and U are formed in a like manner for like phase pixels having the opposite chroma polarity (e.g., L+C) from those used to form vectors P and V (C-A") and (A'-C). These vectors therefore represent the temporal difference between fields III and I and fields III and II.

Referring now to FIG. 10, therein is shown the resulting vector diagram. Vectors U and Q are of opposite polarity and represent corresponding portions of displayed image one field apart and one frame apart, respectively. Vectors P and V have similar characteristics. Thus if no spatial motion has occurred through fields I, II and III, the resultant of vectors V and P and the resultant of vectors U and Q will substantially converge to zero. To account for noise and the like, a predetermined region of convergence is established (through the use of vector filters). If the magnitude components of the resultant vectors fall within this region, the system assumes that no spatial motion has occurred. In the case of no spatial motion, frame combing is permitted.

Figure 11:
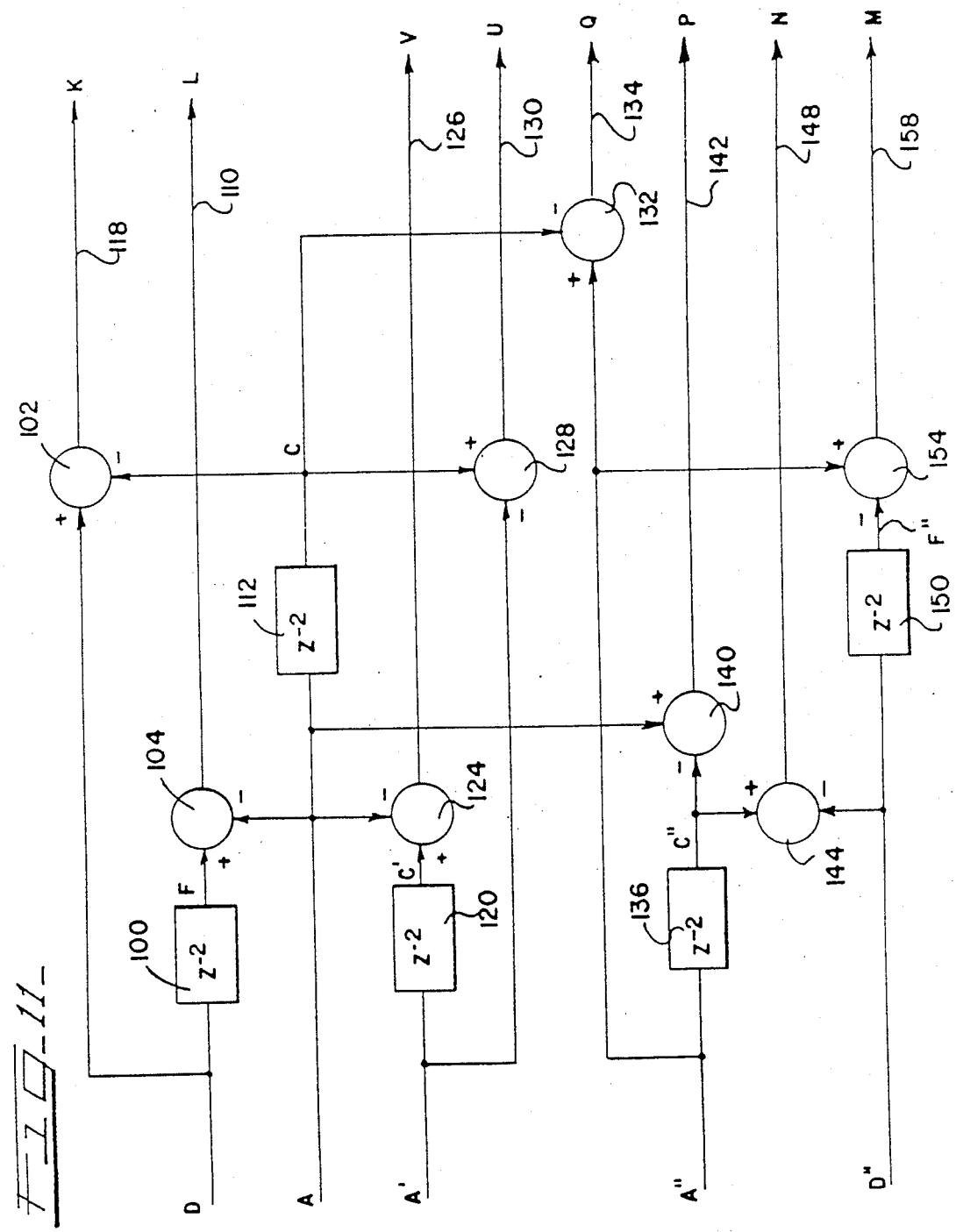
FIG. 11 illustrates a schematic representation of a combination of variables for estimating motion variables in accordance with the technique of a preferred embodiment of the present invention.

FIG. 11 illustrates in block diagram form a circuit for deriving the eight vectors referred to above.

FIG. 12 illustrates a circuit for processing the derived vectors to determine whether frame comb luma/chroma separation should be used or another separation technique should be used.

Referring more specifically to FIG. 11, five input signals are provided to the circuit for deriving the eight vectors L, K, M, N, P, Q, U and V. The five input signals represent the following (with specific examples for line 3, field 3 as the current display line):

(1) D is the previous line (line 1) of the current field (field 3);

(2) A is the current line (line 3) of the current field (field 3);

(3) A' is the interlaced line (line 2) of the previous field (field 2);

(4) A" is the line corresponding to the current line (line 3) of the previous frame (field 1); and (5) D" is the line (line 1) previous to the current line (line 3) of the previous frame (field 1).

The circuit further includes a plurality of two-pixel delay devices $Z^{-2}$ and a plurality of summers. The inputs of the summers are marked with the corresponding pixels from FIG. 8 to illustrate how the vectors are derived.

More particularly, a first pixel delay circuit 100 receives the D pixel signal as does a first summer 102. The first two-pixel delay circuit 100 provides a signal to second summer 104. Once the signal has been delayed by the two-pixel period, it corresponds to pixel 106 from FIG. 8. At its negative input, the second summer 104 receives the current pixel (A) information from the A signal which corresponds to pixel 108 in FIG. 8. As shown in FIG. 8, the output of the second summer 104 then represents the vector L on an output line 110.

A second two-pixel delay circuit 112 receives the current line information from the A pixel signal. Accordingly, the output of the second two-pixel delay circuit 112 represents the pixel 114 from FIG. 8. The first summer 102 then subtracts this pixel value from received signal corresponding to the value of pixel 116 from FIG. 8. The output of the first summer on a line 118 then represents the vector K.

A third two-pixel delay circuit 120 receives the A' pixel signal and provides, as a positive input, a signal corresponding to pixel 122 from FIG. 8 to a third summer 124. The third summer 124 then subtracts the current pixel value, corresponding to pixel 108, from the pixel 122 value to provide the vector V on a line 126. A fourth summer 128 also receives the pixel A' signal as a negative input corresponding to the value of pixel 124 from FIG. 8. It adds to this negative value the pixel value of pixel 114, the output from the two-pixel delay circuit 112, to generate the vector signal U on an output line 130.

A fifth summer 132 receives the A" pixel signal as a positive input. It also receives the output of the two-pixel delay circuit 112 corresponding to the value for pixel 114 as a negative input. The summation of these two signals on a line 134 provides the vector Q.

A fourth two-pixel delay circuit 136 also receives the A" pixel signal to provide an output signal corresponding to the value for the pixel 138 as shown in FIG. 8. A sixth summer 140 receives this value as a negative input and the current pixel value, pixel 108, as a positive input. The summation of these two signals on a line 142 provides the vector P.

A seventh summer 144 receives the output of the fourth two-pixel delay circuit 136 as a positive input. It receives as a negative input the D" pixel signal corresponding to the value for pixel 146 in FIG. 8. The summation of these two on a line 148 provides the vector N.

A fifth two-pixel delay circuit 150 also receives the D" pixel signal to provide at its output a signal corresponding to the value of pixel 152 in FIG. 8. An eighth summer 154 receives this signal as a negative input. The summer 154 combines the negative value for pixel 152 with a positive value for pixel 156 from FIG. 8. The combination of these signals on a line 158 provides the vector M.

It will also be understood that the vectors are derived continuously and are continuously tested for convergence as shown in FIGS. 9 and 10.

Referring to FIG. 12, the eight vectors derived in FIG. 11 are applied to four summers, each of which is coupled to a coring circuit. A typical coring circuit transfer characteristic f(x) is shown in more detail in FIG. 13. For input signals having an absolute magnitude less than a predetermined value $x_0$, the coring circuit output is 0. For magnitudes exceeding $x_0$, the coring circuit provides a positive or negative output determined by the symmetrical linear portions of the transfer characteristic. It will be appreciated that the use of coring circuits such as those shown by the characteristics of FIG. 13 implements the desired convergence region described above for the resultant vectors. Choice of the $x_0$ value for the coring circuits depends upon the noise parameters and desired display characteristics.

The present system can accordingly be adapted to provide improved display picture quality through diminished noise susceptibility. The selection of $x_0$ governs the noise immunity of the system. Larger values of $x_0$ may be selected for noisier environments in which deviations in the received video signal indicate noise rather than actual swings in the video content that would otherwise indicate motion in the picture. In less noisy environments, a smaller $x_0$ value, and hence a smaller convergence zone, may be chosen. Likewise, the choice of the $x_0$ value determines the level of noise that can be accepted by the system before it must be labeled as having motion with the attendant status changes, such as precluding frame combing for excessively noisy video signals.

The coring circuits that implement the f(x) function shown in FIG. 13 may be any of a multiple number of designs. It is envisioned that this is merely a matter of design choice, as long as the selected circuitry provides the range of $x_0$ values for accurate operation in expected noise level for the design environment.

Returning to FIG. 12, the L and M vectors are summed at a first summer 160 to provide an input to the first coring circuit 162, and the K and N vectors are summed at a second summer 164 to provide an input to the second coring circuit 166. If no intra-frame motion has occurred, the outputs of both summers will be relatively small values which will be converted to zero value signals by the respective coring circuits. If intra-frame motion has occurred, the outputs of one or both summers will be relatively large and converted to respective non-zero value signals by the coring circuits. The outputs of the two coring circuits are then compared by a comparator 168. If no intra-frame motion has occurred, both inputs to the comparator are 37 0" and a 37 1" output is produced on an output line 170. If motion has occurred, a 37 0" output is produced. A NAND function may be used to implement this comparison.

Vectors Q and V and vectors P and U are processed in a similar manner through summers 172 and 176 and coring circuits 174 and 178 and a comparator 180. The output of the second comparator is again 37 1" on a line 182, if no inter-frame motion has occurred and 37 0" if there has been motion. Frame combing is considered appropriate if the outputs of both comparators is 37 1" and the signal is in standard form as described below.

Vectors K and L are also coupled to respective chroma band pass filters 184 and 186. The band pass filters 184 and 186 in the preferred embodiment desirably have a bandwidth of fc±0.5 mhz. Additional coring circuits 188 and 190 normalize the outputs of the band pass filters 184 and 186 as discussed above. This circuitry determines whether line combing is appropriate.

In particular, whenever there is a vertical transition in the chroma component, the use of a line comb will result in chroma impairment in the form of hanging dots. A third comparator 192 tests for this condition by testing the chroma components of vectors K and L which are derived from pixels on successive lines of the current field. Thus, if the magnitude of the chroma components of vectors K and L are both less than a predetermined value established by the coring circuits 188 and 190, the comparator 192 will provide a 37 1" output on a line 193 indicating that line combing is appropriate. The comparator 192 will also provide a 37 1" output indicating that line combing is appropriate if both chroma components exceed the predetermined coring level and are equal and the signal is in standard form as discussed below. A 37 0" output will be provided by the comparator 192 representing that line combing is not appropriate if the outputs of the two coring circuits are different.

Summers 191 and 193 in conjunction with absolute magnitude circuits 195 and 197 and summer 199 provide a similar function with respect to the luma signals. A coring circuit 201 processes this output for use in other video processing circuitry and impresses a normalization range on luma transitions.

Before a final decision as to which luma/chroma separation technique to use is made, one last test is performed. This test determines whether the signal is standard or non-standard. In the preferred embodiment, cooperation with a digital television system is envisioned. A digital system typically outputs a signal which indicates whether a received signal is in standard or non-standard form. A standard signal satisfies the relationship $Fc = 455 F_h/2$, while a non-standard one does not. In the preferred embodiment this signal is entitled 37 SKEW" and is received on a line 194 by a standard/non-standard decoder 196. The decoder 196 analyzes this property and provides a 37 1" output on a line 198 if the signal is standard and a 37 0" output if it is non-standard. In the case of a non-standard signal, the other logic is overridden and one-dimensional filtering techniques are used for luma/chroma separation.

A combinational logic circuit 200 receives the outputs of the comparators 168, 180 and 192 and the decoder 196 on lines 170, 182, 193 and 198, respectively. This logic circuit 200 provides output signals at line 202 indicative of the luma/chroma separation technique to be used. The combinational logic circuit 200 illustrated in FIG. 12 is shown in more detail in FIG. 14.

Referring specifically to circuit of FIG. 14, a first AND-gate 204 receives the output of the comparator 168 on a line 170, the output of the second comparator 180 on a line 182 and the output of the decoder 196 on a line 198. The output of the first AND-gate 204 on a line 206 gives an identification of inter-field and intra-field motion, which if not present indicates the desirability of frame comb separation (i.e., three-dimensional) for luma/chroma separation. This output indicates the desirability of using the field difference and vertical detail signals. A second AND-gate 208 receives the output of the third comparator 192 on a line 193, the output of the decoder 196 on the line 198 and the inverted output of the first AND-gate 204. The second AND-gate 208 provides an output on a line 211 that identifies intra-field motion, which if not present is indicative of the desirability of line comb (i.e. two-dimensional) separation for luma/chroma processing. This output suggests the use of line difference and vertical detail signals. A third AND-gate 212 receives the inverted output of the first AND-gate 204 and the inverted output of the second AND-gate 208 to provide an output signal on a line 214. When the signal on the line 214 is high, it indicates the desirability of one-dimensional separation for luma/chroma processing in a straight filtering technique.

This circuit implements the following logic in determining the priority of luma/chroma separation techniques:

1) If the signal on lines 170 and 182 are 37 1" (no spatio-temporal motion) and the signal is standard, frame comb is used.
2) If the signal on line 170 or 182 is 37 0" (motion), but the signal on line 193 is 37 1" (no vertical chroma transition) and signal is standard, line comb is used.
3) If the signal on line 170 or 182 is 37 0" (motion), and this signal on line 193 is 37 0" (vertical chroma transition) filters are used.
4) In any case, if signal is non-standard, filters are used.

It should be understood that the foregoing system is adaptive in an intra-field sense. That is, because luma/chroma separation determinations are continuously made on a pixel-by-pixel basis, different techniques can be employed at different times in a single field. The system will therefore continuously change the luma/chroma separation technique in use depending upon the current pixel information to select that technique most appropriate at any given point in time.

Also, it is envisioned that the general principles of motion detection to control signal processing may be used in systems other than that of the preferred embodiment. For example, a simpler system having the capability of only line combing or filtering could benefit from the same or slightly modified motion detect scheme.

Referring now to FIG. 15, therein is shown a general representation of a digital system for use with the preferred embodiment of the present invention. The video switch 210 may receive the form inputs shown. That is, the envisioned system illustrated in FIG. 15 responds to composite video (CV #1 or CV #2) or to separate chroma (C) and luma (Y) signals. The separate chroma and luma signals may be received in special case applications, such as Super VHS, which supply video signals in this format. The video switch 210 then supplies a corresponding signal to the adaptive comb circuit 214 and a composite video (CV) memory bank 212. The system generally comprises a video switch and analog to digital adaptive luma/chroma separation unit 214.

The memory bank 212 and the adaptive separation unit 214 communicate with a motion detect and memory control 216 in accordance with the present invention as described in more detail above. The output of the motion detect memory control unit 216 controls the adaptive separation unit 214, the output of which is provided to a VPU 218, a DPU 220 and a TPU 222. The output of the adaptive separation unit 214 is also communicated to display circuitry 224. Video signals from the VPU 218 are supplied to a chroma/color difference processing circuit 226. A luma signal from the unit 226 is provided to a luma processing circuit 228, which also receives a video detail signal from the adaptive separation unit 214. The luma processing circuit 228 operates in conjunction with a luma memory bank 232. The output of the luma processing circuit 228 is provided to the display circuitry 224. Correspondingly, the chroma (color difference) output of the circuit 226 is provided to the display circuitry 224.

Figure 16:
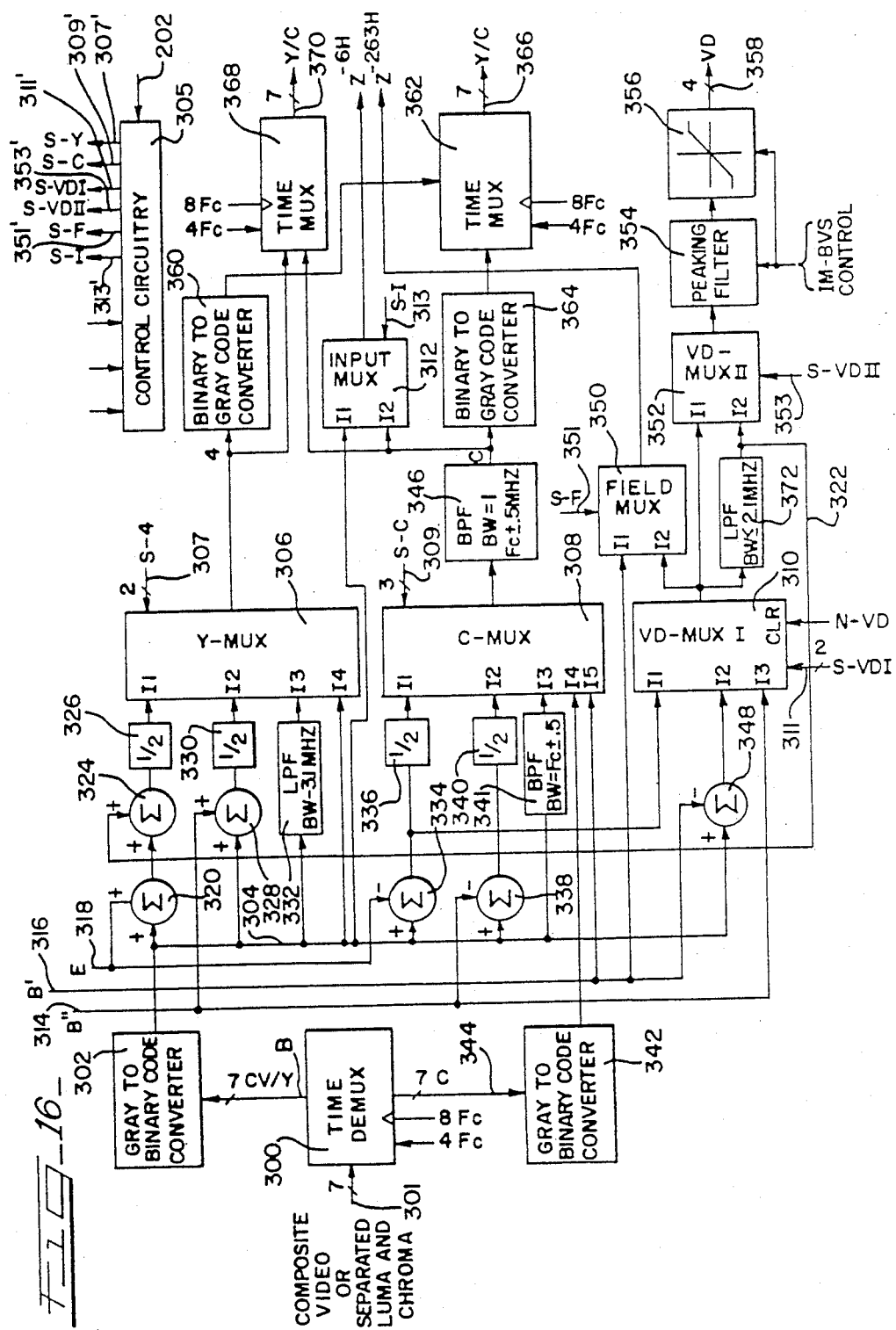
FIG. 16 illustrates a combinational logic implementation for effecting a desired filtering technique in response to the motion detection signals.

Referring now to FIG. 16, therein is shown an implementation according to a preferred embodiment of present invention for the three-dimensional adaptive luma/chroma separation circuit 214, shown previously in FIG. 15. This separation circuit further generates the appropriate vertical detail signal for each implemented separation techniques and also provides input/output compatibility for special case application, such as Super VHS format equipment and signals.

More specifically, the system receives a digital video signal at a time multiplexer 300. For purposes of this discussion, the current pixel values (B) represents the received signal. The multiplexer 300 provides a signal then to a gray to binary code converter 302. The output of the converter 302 is supplied on a line 304 having multiple taps, each of which ultimately communicates to one of three multiplexers, a luma multiplexer 306, a chroma multiplexer 308 or a vertical detail multiplexer 310. In one rare instance, the signal on the line 304 may be provided directly to an input multiplexer 312. The system of FIG. 16 also receives inputs from a memory such as that of the composite video (CV) memory bank 212 shown in FIG. 15.

Particularly, the system receives a signal on a line 314 which represents the corresponding pixel of the same line one frame previously B". The system also receives on a line 316 a signal representative of the corresponding pixel in the adjacent, interlaced line in the previous field B'. Finally, the system receives on a line 318 signal representative of the corresponding pixel in the previous line E of the same field.

A system of summers and scaling circuits associated with each of the luma/chroma multiplexers provides for the desired frame or line combing or filtering for the selected luma/chroma separation technique. More specifically, a first summer 320 adds the current line signal with the previous line signal to provide an output signal representative of twice luma with chroma being cancelled. This signal is summed with the signal on line 322 representative of the low frequency components of the vertical detail signal at a second summer 324. This adds back in the vertical detail which may have been removed with the chroma components at the first summer 320. The output of the second summer 324 scaled by a circuit 326 to provide input I1 to the luma multiplexer 306. This input represents line combed luma corrected with vertical detail. Another summer 328 receives at one positive input the current line signal. The summer 328 receives at its other positive input the corresponding line signal from the previous frame from the input line 314. This effectively cancels the chroma component and provides a signal having twice luma magnitude to a one-half scaling circuit 330. The output of the scaling circuit 330 provides input I2 to the luma multiplexer 306, thereby representing frame combed luma.

A low pass filter 332 receives the current pixel signal from the input line 304 and provides a low pass filtering. The output of low pass filter 332 forms input I3 to the luma multiplexer 306, thereby representing filtered luma with chroma desirably filtered out. Finally, input I4 to the luma multiplexer 306 represents the current pixel information from the input line 304.

Correspondingly, a summer 334 subtracts the previous display line information on input line 318 from the current line information on input line 304. This cancels luma and provides a signal having twice the chroma magnitude. A scaling circuit 336 scales this signal to provide input I1 to the chroma multiplexer 308. Input I1 thereby represents line combed chroma. Similarly, a summer 338 subtracts the display line information from the previous frame from the current line information on input line 304. This cancels luma and provides a signal at twice normal chroma magnitude. A one-half scaling circuit 340 provides input I2 to the chroma multiplexer 308. Input I2 then represents frame combed chroma.

Input I3 to the chroma multiplexer 308 simply represents the band passed information from line 304 as filtered by a bank pass filter 341. The band pass filter 341 desirably has a pass band of $F_c \pm 0.5$ mHz as shown. Input I4 to the chroma multiplexer 308 provides a special case situation (Super VHS) from a second gray to binary code converter 342 which receives a pure chroma signal from the time multiplexer 308 on a line 344. Input I5 to the chroma multiplexer 308 represents the line signal from the interlaced line of the previous field supplied on the input line 316. The output of the chroma multiplexer 308 is provided to a band pass filter 346. Desirably, the band pass filter 346 has a band width centered at Fc having a range of plus or minus 0.5 MHz ($\pm 0.5$ MHz).

Yet another summer 348 generates a vertical detail signal as input I2 to the vertical detail multiplexer 310. The summer 348 subtracts the previous, interlaced line signal on the input line 316 from the current line signal on input line 304. The vertical detail multiplexer 310 also receives a signal corresponding to twice chroma as the output from the line combing summer 334 as its input I1. Finally, the vertical detail multiplexer 310 receives video corresponding to the previous frame, same line, from the input line 314 as its input I3.

Operation of the time demultiplexor 300 depends on user identification of the desired mode. The preferred embodiment envisions a menu-driven display which allows the user to select special case applications, such as Super VHS. Selection of the Super VHS mode reconfigures the time demultiplexor 300 to provide previously separated, time multiplexed luma (Y) and chroma (c) from input line 301 to dual gray to binary code converters 302 and 342. As noted above, the output of these converters provide input I4 to each of the luma/chroma multiplexors 306 and 308.

Other components shown in FIG. 16 also facilitate the desired luma/chroma separation and vertical detail generation. A field multiplexer 350 operates in conjunction with the input multiplexer 312 to provide signals to the memory tops. The input multiplexer 312 outputs either the current pixel data or the band passed, combed chroma. The field multiplexer 350 corresponding outputs the previous-field pixel data or the output of the vertical detail multiplexer 310.

Similarly, a second vertical detail multiplexer 352 outputs either the vertical detail signal from the vertical detail multiplexer 310 or a low pass filtered derivative of that signal. A peaking filter 354 and limiter 356 then act on the output of the second vertical detail multiplexer 352 to provide a vertical detail output signal on a line 358. These last components tend to limit the Kell effect in the displayed picture. That is, because of limits in the original television camera aperture, vertical resolution is correspondingly limited. The peaking filter and limiter keep the vertical detail signal frequency and magnitude within corresponding limits. Absent this processing, undesirable distortion can occur in the displayed picture. Unfortunately, the displayed picture at the television is limited by the quality of the equipment that originally changes a real-life object into first an optical image and then an electromagnetic signal description of that optical image.

A binary to gray code converter 360 receives the luma output from the luma multiplexer 306. A time multiplexer 362 then receives the converted output from the converter 360. A second gray to binary code converter 364 receives the chroma output from the band pass filter 346 at the output of the chroma multiplexer 308. The first time multiplexer 362 also receives the output of the second binary to gray code converter 364 the second time multiplexer, in response to timing signals at the sampling rate (4Fc) and at twice the sampling rate (8Fc) then outputs gray code, time-multiplexed, separated luma and chroma on a line 366 for further processing and ultimately display.

A second time multiplexer 368 receives the binary coded luma and chroma directly from the luma multiplexer 306 and the band pass filter 346 at the output of the chroma multiplexer 308. In response to timing signals at the sampling rate (4Fc) and at twice the sampling rate (8Fc), the second time multiplexer 368 outputs time-multiplexed, separated luma and chroma on a line 370. This provides, thus, both source and display compatibility with Super VHS format signals without undue processing—which can only degrade the picture quality through unnecessary processing steps. These Super VHS compatible signals can then be directly digital to analog converted without the further processing typically associated with other video signals, such as those present at the output of the first time multiplexer 362 on the line 366.

Once again, the first vertical detail multiplexer 310 receives at its I1 input a signal representing twice line-combed chroma, at its I2 input a signal representing field difference, and at its I3 input a signal representing the previous frame information. The output of the first vertical detail multiplexer 310 forms input I2 to the field multiplexer 350, input I1 to the second vertical detail multiplexer 352 and the only input to low pass filter 372. The output of the low pass filter 372 forms input I2 to the second vertical detail multiplexer.

In operation, the first vertical detail multiplexer 310 selects the appropriate input to pass as output depending upon whether motion has been detected dynamic condition) or not (static condition). For the dynamic condition, input I1 is (line difference) is selected. For the static condition, input I2 (field difference) is selected.

The second vertical detail multiplexer 352 operated in conjunction with the first to provide, ultimately a vertical detail signal output at line 358. The second vertical detail multiplexer 352 selects the output of the first vertical detail multiplexer 310 or the output of the low pass filter 372 depending upon whether composite video was received or separate luma/chroma (SVHS) were received and on whether a static or dynamic condition exists. If the system is in the composite video mode and a static condition exists, the second vertical detail multiplexer 352 selects the unfiltered output of the field difference signal. However, if the system is in the composite video mode and a dynamic condition exists, the second vertical detail multiplexer selects the filtered output—which removes the chroma to leave only the luma, line difference from the field.

On the other hand, whenever the system is in the Super VHS mode, the second vertical detail multiplexer 352 always selects the unfiltered output of the first vertical detail multiplexer 310; in this mode, there is no chroma in the signal and, hence, no reason to separate the chroma from the vertical detail signal. (Note that feedback line 322 adds luma back to the line filtered luma that forms input I1 to the luma multiplexer 306—this avoids unwanted vertical filtering the displayed picture when vertical transitions occur.)

Referring now to FIG. 17, therein is shown a table representing the selected inputs for each of the various multiplexers shown in FIG. 16. The multiplexers shown in FIG. 16 respond to the control signals generated by the motion detection circuit and techniques described above. The control signals arrive via internal system wiring represented by output line 202 in FIG. 12. The luma multiplexer 306 receives the control signals at an input line 307 to select the appropriate input. The chroma multiplexer 308 receives the control signals at an input line 309 to select the appropriate input. The vertical detail multiplexer 310 receives the control signals at a control line 311 to provide a vertical detail signal corresponding to the selected luma/chroma separation technique.

A control circuit 305 responds to the control signal on a line 202' (corresponding to line 202 in FIG. 12) and to signals representative of the vertical rate ($F_v$), the sampling rate (4Fc) and twice the sampling rate (8Fc). The control circuit 305 then provides the control signals that selectively switch the multiplexers in the preferred embodiment. The inputs to the control circuit 305 provide it with information as to whether there is motion or not (and correspondingly which separation technique to select and timing information to allow continuous processing on a pixel basis.

In addition to the luma, chroma and vertical detail multiplexers 306, 308 and 310, the control circuitry 305 also manipulates additional circuitry to provide the desired outputs in accordance with the tables of FIG. 17. The central circuit 305 also governs the multiplexing operation for the input multiplexer 312, at a line 313, the field multiplexer 350, at a line 351, and a second vertical detail multiplexer 352 at a line 353. The corresponding control signal outputs from the control circuit 305 are shown at lines 307'-313', 351' and 353'.

The configuration of the control circuit 305 is a matter of design choice and convenience. The operating parameters are given by the table of FIG. 17 and by the timing information provided by the 4Fc, 8Fc and Fv timing signals.

The table of FIG. 17 comprises a first section for composite video and a second section for a special case application. It is based on the following conditions:

S (standard): $455/2\ F_H = F_c$.
NS (non-standard) $455/2\ F_H$ does not equal $F_c$.
Static: refers to the presence of a motionless pixel.
Dynamic: refers to the presence of motion for the pixel in question.

FIG. 17 thereby shows the desired result and implementation as discussed above. For example, in a static condition (i.e., motionless pixel) with a standard signal, both the luma and the chroma multiplexers will choose the frame comb input. In contrast, in a dynamic condition (i.e.. motion for the pixel in question), and a standard input signal, both the luma and chroma multiplexers will choose I1, the line comb input. Finally, in response to any non-standard signal, each of the luma and chroma multiplexers will choose I3 as the appropriate input, thereby providing for filtering of the composite video signal to separate luma and chroma.

Also illustrated by FIG. 17 is an additional feature which provides for display and source compatibility with Super VHS format tapes and equipment. As is known, Super VHS provides a wider bandwidth signal to provide greater detail in the displayed picture. Also, Super VHS provides luma and chroma already separated, and accordingly, the television system has no need to provide additional separation. Accordingly, in such circumstances it is desirable to provide the luma and chroma directly for display rather than attempting to perform luma/chroma separation processing which could only distort the already separated signals. Accordingly, the time multiplexer 300 recognizes the super VHS format and provides the luma to the first gray to of binary code converter 302 and provides the chroma to the second gray to binary code converter 342. Thus, as shown in the Y/C section of the table of FIG. 17, input I4 to each of the luma multiplexer 306 and the chroma multiplexer 308 will represent separated luma and chroma, respectively, in the presence of the super VHS format signal. In such a condition, each of the multiplexers will choose the I4 input and thereby pass the already separated luma and chroma for further processing and display.

Although the preferred embodiment has been described in terms of a system for use with the NTSC broadcast standards, it is envisioned that the present invention may be used with equal facility with other broadcast standards. The fundamental operation of the luma/chroma filtering, line combing and frame combing will remain predictable, as long as the relationship between luma and chroma in the broadcast signal remains predictable. Desirably, the chroma phase/polarity relationship that is relied upon in generating the motion indication variables will remain regardless of the broadcast standards. Modification and alteration of the preferred embodiment to accommodate other broadcast signal standards is deemed to be within the skill of those in the art who have become familiar with the teachings of the application.

What I claim is:

1. A video processing system comprising:
   first means for selecting one of a plurality of luma separation techniques, said first means comprising first multiplexer means responsive to control signals for selecting one of a plurality of inputs, each input comprising a video signal containing separated luma components from a received video signal as a result of a separation technique distinct from each of the other inputs;
   second means for selecting one of a plurality of chroma separation techniques, said second means comprising second multiplexer means responsive to control signals for selecting one of a plurality of inputs, each input comprising a video signal containing separated chroma components from said received video signal as a result of a separation technique distinct from each of the other inputs;
   third means for generating a corresponding vertical detail signal, said third means comprising third multiplexer means responsive to control signals for selecting one of a plurality of inputs, each input comprising a signal representative of the vertical detail in said received video signal;
   said third multiplexer means further comprising
      an initial multiplexer adapted to receive a plurality of input signals representative of the vertical detail in said received video signal and to provide one of said inputs as an output; and
      a secondary multiplexer adapted to receive said output from said initial multiplexer as one input and the said output in a low pass filtered form as another input and to provide one of said one and said another inputs as an output vertical detail signal.

2. The video processing system of claim 1 wherein each of said multiplexer means responds to said control signals at least once per pixel.

3. The video processing system of claim 1 further comprising peak filter means adapted to receive said vertical detail signal for maintaining said vertical detail signal within a preselected magnitude range.

4. The video processing system of claim 1 further comprising means for providing said low pass filtered output of said initial multiplexer to at least one of said inputs to said first multiplexer means.

5. The video processing system of claim 1 wherein said inputs to said first multiplexer comprise:
   a first input representative of line combed luma from a received video signal;
   a second input representative of frame combed luma from said received video signal; and
   a third input representative of said received video signal in a low pass filtered form.

6. The video processing system of claim 1 wherein said inputs to said second multiplexer comprise:
   a first input representative of line combed chroma from a received video signal;
   a second input representative of frame combed chroma from said received video signal; and
   a third input representative of said received video signal in a band pass filtered form.

7. The system of claim 6 wherein:
   said inputs to said first multiplexer further comprise a fourth signal representative of separated luma components of said received video signal;
   said inputs to said second multiplexer further comprise a fourth signal representative of separated chroma components of said received video signal; and
   output means coupled to receive the outputs of said first and second multiplexers to provide said received separated luma and chroma directly as an output signal.

8. A video processing system comprising:
   first means for selecting one of a plurality of luma separation techniques comprising first multiplexer means responsive to control signals for selecting one of a plurality of inputs, each input being a video signal containing separated luma components from a received video signal as a result of a separation technique distinct form each of the other inputs;
   second means for selecting one of a plurality of chroma separation techniques comprising second multiplexer means responsive to control signals for selecting one of a plurality of inputs, each input being a video signal containing separated chroma components from said received video signal as a result of a separation technique distinct from each of the other inputs;
   third means for generating a corresponding vertical detail signal comprising third multiplexer means responsive to control signals for selecting one of a plurality of inputs, each input comprising a signal representative of the vertical detail in said received video signal; an wherein
   said inputs to said third multiplexer comprise
      a first signal representative of a difference between a current display line and an adjacent display line in said received video signal,
      a second signal representative of a difference between said current display line and a corresponding display line in an adjacent display field, and
      a third signal representative of a display line in an adjacent display frame.

9. A luma/chroma separation and vertical detail signal generation circuit comprising;
   means for receiving a current video signal;
   means for providing previous video signals corresponding to said current video signal;
   means for selectively combining said current and previous video signals to generate frame combed and line combed luma signals and frame combed and line combed chroma signals;
   means for filtering said current video signal to provide a filtered luma signal and a filtered chroma signal;
   means for selectively combining said current and previous video signals to generate a line difference signal and a field difference signal;
   first multiplexer means for selecting one of said frame combed, line combed and filtered luma signals as an output signal;

second multiplexer means for selecting one of said frame combed, line combed and filtered chroma signals as an output signal; and third multiplexer means for selecting one of said line difference and fieled difference signals as an output signal.

10. The circuit of claim 9 wherein said third multiplexer means further comprises:

an initial multiplexer adapted to receive said line difference and field difference signals as inputs and provide an output signal;

filter means coupled to receive said output from said initial multiplexer; and secondary multiplexer means coupled to said output from said initial multiplexer and to said filter means for selecting one input as an output signal.

11. The circuit of claim 10 further comprising peaking filter means coupled to receive said output of said secondary multiplexer means and provide a peak limited vertical detail output signal.

12. The circuit of claim 10 further comprising feedback means coupled between said third multiplexer means and said means for selectively combining to provide additional luma information.

13. The circuit of claim 9 wherein:

said first multiplexer means also receives a signal representative of separated luma from said current video signal; and said second multiplexer means also receives a signal representative of separated chroma from said current video signal.

14. The circuit of claim 13 wherein said means for receiving a current video signal comprises:

input means operable in two modes, a first mode corresponding to composite video signals and a second mode corresponding to current video signals having separate luma and chroma signals;

first channel means for providing said composite video to said means for combining and said means for filtering in said first mode and for providing one of said separated luma and chroma signals to one of said first and second multiplexer means in said second mode; and second channel means for providing the other of said separated luma and chroma signals to the other of said first and second multiplexer means in said second mode.

15. The circuit of claim 9 wherein said third multiplexer means also receives a previous video signal corresponding to said current video signal as an input.

* * * * *